(12) United States Patent
Brouard et al.

(10) Patent No.: US 9,055,240 B2
(45) Date of Patent: Jun. 9, 2015

(54) POLYCHROMATIC IMAGING METHOD

(75) Inventors: Laurent Brouard, Toulouse (FR); Cyrille Tourneur, Toulouse (FR)

(73) Assignee: Airbus Defence and Space SAS, Les Mureaux (FR)

( * ) Notice: Subject to any disclaimer, the term of this patent is extended or adjusted under 35 U.S.C. 154(b) by 389 days.

(21) Appl. No.: 13/696,249

(22) PCT Filed: Apr. 28, 2011

(86) PCT No.: PCT/FR2011/050977
§ 371 (c)(1),
(2), (4) Date: Nov. 5, 2012

(87) PCT Pub. No.: WO2011/138541
PCT Pub. Date: Nov. 10, 2011

(65) Prior Publication Data
US 2013/0050488 A1 Feb. 28, 2013

(30) Foreign Application Priority Data
May 4, 2010 (FR) ...................................... 10 53450

(51) Int. Cl.
*H04N 9/64* (2006.01)
*H04N 5/33* (2006.01)
*G01B 9/06* (2006.01)
(Continued)

(52) U.S. Cl.
CPC .. *H04N 5/33* (2013.01); *G01B 9/06* (2013.01); *G02B 23/12* (2013.01); *G02B 27/1006* (2013.01); *G02B 27/46* (2013.01); *H04N 5/332* (2013.01)

(58) Field of Classification Search
CPC ........................................................ G01B 9/06
See application file for complete search history.

(56) References Cited

U.S. PATENT DOCUMENTS

| 3,971,065 A | 7/1976 | Bayer |
| 5,237,452 A | 8/1993 | Okayama et al. |

(Continued)

FOREIGN PATENT DOCUMENTS

| CN | 102982517 A | * 11/2012 |
| JP | 05 66370 | 3/1993 |

OTHER PUBLICATIONS

Hirakawa et al. "Spatio-Spectral Color Filter Array Design for Optimal Image Recovery" IEEE Transactions on Image Processing, Vol. 17, No. 10, Oct. 2008.*

(Continued)

*Primary Examiner* — Sath V Perungavoor
*Assistant Examiner* — Matthew J Anderson
(74) *Attorney, Agent, or Firm* — Patterson Thuente Pedersen, P.A.

(57) ABSTRACT

The invention relates to a polychromatic imaging method, using a picture-taking instrument, which is placed on board an aircraft or satellite, which enables a reduction of the size of the instrument without reducing resolution of a final obtained image. To this end, a pupil of the instrument is sized for intermediate images that are limited to a first spectral sub-band without any image information being completely transmitted by the instrument for at least one wavelength that is located beyond said first spectral sub-band. Merging the intermediate image, inputted for the first spectral sub-band, with at least one other intermediate image, inputted for another spectral sub-band, recreates a polychromatic visual rendering that is satisfactory for the final image. Said other intermediate image includes the wavelength located beyond the first sub-band.

19 Claims, 4 Drawing Sheets

(51) Int. Cl.
  *G02B 27/46* (2006.01)
  *G02B 23/12* (2006.01)
  *G02B 27/10* (2006.01)

(56) References Cited

U.S. PATENT DOCUMENTS

| | | | | |
|---|---|---|---|---|
| 5,276,321 | A | * | 1/1994 | Chang et al. .................. 250/226 |
| 5,841,574 | A | * | 11/1998 | Willey ............................ 359/351 |
| 6,009,340 | A | * | 12/1999 | Hsia ............................... 600/407 |
| 6,763,149 | B2 | * | 7/2004 | Riley et al. ..................... 382/294 |
| 2004/0119020 | A1 | * | 6/2004 | Bodkin ............................ 250/353 |
| 2006/0054782 | A1 | | 3/2006 | Olsen et al. |
| 2009/0051984 | A1 | | 2/2009 | O'Brien et al. |
| 2009/0141140 | A1 | * | 6/2009 | Robinson ..................... 348/222.1 |
| 2010/0092086 | A1 | * | 4/2010 | Lei et al. ........................ 382/173 |
| 2011/0085051 | A1 | * | 4/2011 | Chi et al. ..................... 348/222.1 |
| 2011/0299768 | A1 | * | 12/2011 | Singh et al. ..................... 382/162 |

OTHER PUBLICATIONS

English translation of International Search Report and Written Opinion for application PCT/FR2011/050977, Aug. 8, 2011, 9 pgs.

Geosage, "Mapping our land more clearly and colourfully for better analysis and visualization", http://www.geosage.com/highview/imagefusion.html, accessed Mar. 23, 2010, 2 pgs.

PCI Geomantics, "Technical Specifications Pan Sharpening", http://www.pcigeomatics.com/pdfs/pan_sharpening.pdf, Oct. 1, 2007, 2 pgs.

* cited by examiner

POLYCHROMATIC IMAGING METHOD

PRIORITY CLAIM

The present application is a National Phase entry of PCT Application No. PCT/FR2011/050977, filed Apr. 28, 2011, which claims priority from French Application Number 1053450, filed May 4, 2010, the disclosures of which are hereby incorporated by reference herein in their entirety.

FIELD OF THE INVENTION

This invention relates to a polychromatic imaging method which uses an image-sensing optical system carried on board an aircraft or spacecraft such as a satellite. It also relates to a polychromatic imaging system for implementing such a method.

BACKGROUND OF THE INVENTION

Imaging performed from an aircraft or satellite has specific constraints which do not exist in other domains such as photography intended for the general public. These constraints include such issues as:

the need to use an image-capturing instrument such as a telescope, at long observation distances, having a good resolution, meaning a fine resolution, in spite of the very great image capture distance, reducing the weight and size of the image-capturing instrument, which depends to a large extent on the dimensions of the optical components used for the image-sensing optical system, the interfering movements of the aircraft or satellite which are transmitted to the image-capturing instrument, except for geostationary satellites, the moving of the portion of the Earth's surface which is being photographed, relative to the aircraft or satellite, and the need to reduce the amount of data transmitted to the Earth for the same captured image.

Traditionally, the following parameters are used to quantify the performance of an imaging system:

the resolution, which is also referred to as Ground Sample Distance (GSD), for an imaging system carried on board an aircraft or satellite. This is the minimum distance there must be between two points, on the portion of the Earth's surface which is being photographed, for these points to appear separately in the captured image. It is equal to the size of the photodetectors of the array concerned, divided by the focal length of the image-sensing optical system which is used, multiplied by the distance between the object and the image: $GSD=(p/D_{foc}) \times H$, where p is the pitch between photodetectors, $D_{foc}$ is the focal length, and H is the distance between the object and the image;

the Nyquist frequency, which is denoted $v_N$ and which is equal to the inverse of twice the pitch of the sampling conducted by an array of photodetectors when capturing an image of a viewed object. In other words: $v_N=1/(2 \times GSD)$ in the object space, or $v_N=1/(2 \times p)$ in the image space. The Nyquist frequency therefore only depends on the size of the photodetectors of the array and on the focal length of the image-sensing optical system;

the modulation transfer function, which is referred to as MTF and characterizes the variation in contrast between the image and the photographed object, when this object has a spatial variation in light intensity. The modulation transfer function depends on the spatial frequency of the variation in light intensity of the object, and on the wavelength of the radiation detected; and the cutoff frequency of the image-sensing optical system, which is denoted $v_C$ and which is the spatial frequency of the variation in light intensity of the object for which the modulation transfer function is reduced to zero, for the radiation wavelength which is detected.

The modulation transfer function results from several contributions, including:

a contribution from the image-sensing optical system, which depends on the light diffraction caused by its pupil and on optical aberrations of this instrument;

a contribution from the photodetectors, which depends on the individual performances of each photodetector and on crosstalk that may arise between photodetectors; and a contribution from the movements and vibrations of the aircraft or satellite during the exposure period when capturing an image.

However, the cutoff frequency $v_C$ is a characteristic of the image-sensing optical system alone, dependent on the pupil diameter, the focal length, and the wavelength considered. Given that the cutoff frequency depends essentially on the diffraction of radiation by the pupil of this optical system, it decreases as a function of the wavelength of the radiation transmitted by this optical system. As a result, when an image is captured which is formed from radiation containing several wavelengths, the resulting cutoff frequency $v_C$ is the one corresponding to the longest of these wavelengths. Only the object's variations in light intensity which have spatial frequencies less than the cutoff frequency $v_C$ are transmitted by the image-sensing optical system.

In general, an image-capturing instrument intended for use on board an aircraft or satellite, most often the telescope itself, is designed based on a desired resolution value. This resolution value determines the pair of parameters consisting of the focal length of the image-sensing optical system and the size of the photodetectors in the image detection array which is used. Then the dimensions of the entrance pupil of the image-sensing optical system are determined, with other parameters, so that the light diffraction caused by this pupil is compatible with the desired resolution value. To this end, the pupil is sized so that the cutoff frequency $v_C$ is greater than the Nyquist frequency $v_N$.

Many imaging systems already exist for capturing an image of a portion of the Earth's surface with color information. Usually, several images of the same portion of the Earth's surface are captured through filters which correspond to different colors, then the images which were captured for these colors are superimposed to obtain a reconstructed polychromatic image. In the polychromatic imaging technique known as pansharpening, one of the filters is said to be wide band, or panchromatic, because it contains all the respective colors of the other filters. In addition, the image corresponding to the panchromatic filter is captured with a finer resolution value than those of the monochromatic images. This panchromatic image therefore contains the structural information of each of the other colors. The resolution of the reconstructed polychromatic image then corresponds to the smallest of the individual resolution values of the images which are superimposed, meaning the finest resolution, which is that of the panchromatic image. The image-capturing instrument, particularly its pupil diameter, is then sized according to this smallest value of the resolutions of the individual captured images. The dimensions are therefore excessive for the monochrome images which have larger individual resolutions, meaning coarser resolutions. In addition, the amount of data corresponding to the reconstructed polychromatic image is equal to the sum of the amounts of data for each individual image which is captured, multiplied by the number of filters used. The total amount of data which corresponds to a reconstructed polychromatic image is therefore increased.

In photography intended for the general public, which is distinct from photography from an aircraft or spacecraft for the reasons listed above, a trichromatic image is captured in a single exposure. To this purpose, each photodetector in the array is individually combined with a color filter, which may be blue, green, or red. When the same number of photodetectors is dedicated to each filter color, the resolution of the camera corresponds to that of the array for each color.

Document U.S. Pat. No. 3,971,065 proposes a specific assignment of photodetectors in the image detection array to the colors blue, green and red: one out of every two photodetectors is associated with the green filter, one out of every four photodetectors is associated with the blue filter, and one out of every four photodetectors is associated with the red filter. The resolution of the image associated with the green color therefore corresponds to the pitch of the array used, multiplied by $\sqrt{2}$, while the resolutions associated with the colors blue and red each correspond to twice the pitch of the array used. The color green is thus chosen in order to reduce the value of the resolution of the reconstructed polychromatic image. As the color green is close to the maximum spectral sensitivity of the human eye, the polychromatic image reconstructed by superimposing the three-color images has substantially the resolution of the color green.

Lastly, document US 2009/0051984 describes an improvement to the image capture method of U.S. Pat. No. 3,971,065. This improvement consists of adding photodetectors which are dedicated to capturing an image across all wavelengths of visible light, or panchromatic, in addition to monochrome images which are captured by the photodetectors associated with the green, blue and red filters.

Under these conditions, one object of the invention consists of reducing the dimensions of an image-capturing instrument which is carried on board an aircraft or spacecraft, without reducing the resolution of polychromatic images obtained with this instrument. This object particularly concerns the telescope, which is generally the heaviest and most voluminous part of the image-capturing instrument.

Another object of the invention consists of improving the apparent resolution of a polychromatic imaging system which is used to capture images of the Earth from an aircraft of spacecraft, without increasing the dimensions of the pupil of the image-capturing instrument in comparison to known imaging systems.

Yet another object consists of improving the rendering quality of a polychromatic image obtained from an aircraft or a spacecraft.

Yet another object consists of improving the modulation transfer function of an imaging system adapted to capture images of the Earth from an aircraft or spacecraft, for a fixed dimension of the pupil of the image-capturing instrument that is used.

Another last object consists of reducing the amount of data to be transmitted for a polychromatic image, while the resolution value for this polychromatic image remains the same.

SUMMARY OF THE INVENTION

To achieve these and other objects, the invention proposes a new method of polychromatic imaging in the spectral band of 360 nm (nanometers) to 950 nm used for observation. This method uses an image-sensing optical system adapted to form respective views in at least one focal plane, from radiations within several spectral sub-bands that are each contained within the observed spectral band. This image-sensing optical system itself has a spatial cutoff frequency which is different for each spectral sub-band.

The method comprises the following steps:

1. carrying the image-sensing optical system comprising the telescope on board an aircraft or spacecraft;

2. placing at least one array of photodetectors in said at least one focal plane, in order to capture an intermediate image of each view formed by the image-sensing optical system, at a resolution associated with said intermediate image;

3. respectively capturing the intermediate images of a same scene for each spectral sub-band; and 4. merging the intermediate images respectively captured for the spectral sub-bands, in order to form a final polychromatic image.

In a first characteristic of the invention, the spectral sub-bands which are used contain a first spectral sub-band and at least one other spectral sub-band extending towards long wavelengths, the latter having at least one wavelength which is greater than an upper limit of the first spectral sub-band. Other spectral sub-bands may possibly also be used to form the final polychromatic image, in addition to the first sub-band and said sub-band extending towards the long wavelengths.

In a second characteristic of the invention, the telescope of the image-sensing optical system determines a pupil which is common to the spectral sub-bands, and a dimension of this common pupil sets a spatial cutoff frequency which is different for each spectral sub-band. The pupil is then sized so that the spatial cutoff frequency for the first spectral sub-band is greater than the Nyquist frequency of the intermediate image captured for this first spectral sub-band. In other words, the information contained in the intermediate image captured for the first spectral sub-band is limited by the sampling of the corresponding view that is performed by the photodetectors.

In a third characteristic of the invention, the pupil of the telescope is additionally sized so that the spatial cutoff frequency, for said other spectral sub-band extending towards the long wavelengths, is less than the Nyquist frequency of the intermediate image captured for the first spectral sub-band. In other words, the intermediate image for this other sub-band extending towards the long wavelengths does not contain image information at the resolution of the first sub-band, at least for the wavelength located beyond the first sub-band.

In this manner, the invention allows reducing the size of the image-sensing optical system below what is required to obtain maximal image information across all spectral sub-bands. A significant decrease in the weight and volume of the image-sensing optical system results, particularly in the telescope itself. The cost of this optical system is consequently reduced, and the aircraft or spacecraft used to carry it can then also be smaller. For a satellite, the launch costs are also reduced.

However, the final polychromatic image which is reconstructed in step 4 has the resolution that is the finest among what is obtained for the first spectral sub-band and what is obtained for the spectral sub-band extending towards the long wavelengths. These resolutions of intermediate images are preferably selected so that the finest resolution is that of the intermediate image captured for the first spectral sub-band.

In an embodiment of the invention, the first spectral sub-band contains the 550 nm wavelength. This wavelength, which is associated with the color green, is close to the maximum spectral sensitivity of the human eye. An observer of the final image therefore perceives its details at the resolution of the intermediate image captured for the first spectral sub-band, even if the details are not resolved in the intermediate image captured for the sub-band extending towards the long wavelengths. Even so, this last intermediate image contributes to the recovery of colors so that the polychromatic rendering of the final image is satisfactory.

In addition, the method of the invention can be particularly advantageous when the scene for which the intermediate images are captured in step 3 is a portion of the Earth's surface. One particular case is when the first spectral sub-band corresponds to the color green. This color also substantially corresponds to the maximum spectral intensity of the visible light reflected into space by the Earth's surface, outside of cloud-covered areas.

To obtain a complete polychromatic rendering of the final image, the spectral sub-bands are advantageously distributed in the following manner: the first sub-band corresponds to the color green, the other spectral sub-band extending towards the long wavelengths corresponds to the color red, and yet another spectral sub-band corresponds to the color blue. However, to implement the invention, it is not necessary for the resolution of the intermediate image captured for the color blue to be that of the color green. In other words, the blue sub-band may be used solely for contributing to the polychromatic rendering of the final image, without contributing to its resolution which is only produced by the green sub-band.

The invention also proposes a polychromatic imaging system which is adapted to implement a method as described above. Such a system comprises:
  the image-sensing optical system comprising the telescope,
  at least one array of photodetectors,
  a control unit, which is adapted to control the respective capture of intermediate images of a same scene for each spectral sub-band, and
  an image reconstruction unit, which is adapted to merge the intermediate images respectively captured for the spectral sub-bands, in order to form the final polychromatic image.

The spectral sub-bands and the size of the pupil of the telescope are selected for this polychromatic imaging system in the manner described above for the method.

BRIEF DESCRIPTION OF THE DRAWINGS

Other features and advantages of the invention will become apparent from reading the following description of three non-limiting exemplary embodiments, with reference to the attached drawings in which:

FIGS. 2b and 2c illustrate a use of an array of photodetectors for the first mode of capturing intermediate images of FIG. 2a;

FIG. 3b corresponds to FIGS. 2b and 2c for the second mode of capturing intermediate images of FIG. 3a.

For clarity sake, the dimensions of the elements represented in these figures do not correspond to the actual dimensions nor to the ratios between the actual dimensions. In addition, the same references indicated in the various figures denote the same elements or those with identical functions.

DETAILED DESCRIPTION OF THE DRAWINGS

The invention is now described to illustrate images of portions of the Earth's surface which are taken from a satellite. It is understood, however, that it can apply to images of the ground which are captured from any craft positioned up above, whether stationary or moving. In particular, the invention can be applied to images captured from any aircraft, including unmanned aircraft.

Figure 1:
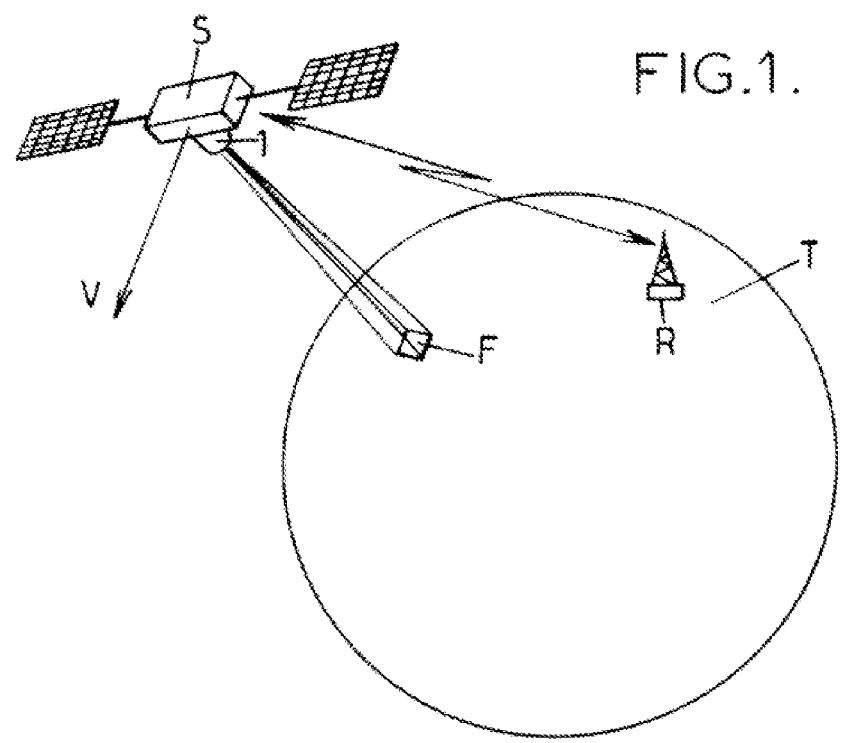
FIG. 1 represents an Earth observation satellite on which the invention can be used.

As shown in FIG. 1, a satellite S is in orbit around the Earth T. The altitude of the satellite S may be any altitude. It may be a geostationary satellite or a low-altitude satellite, said to have a moving Earth orbit. The satellite S is equipped with an image-capturing instrument. This has an optical entrance field pointing towards a portion F of the Earth's surface which is to be photographed. The arrow indicates the angular velocity V of the satellite S relative to the portion of the Earth's surface F. This velocity is zero for a geostationary satellite.

Figure 2A:
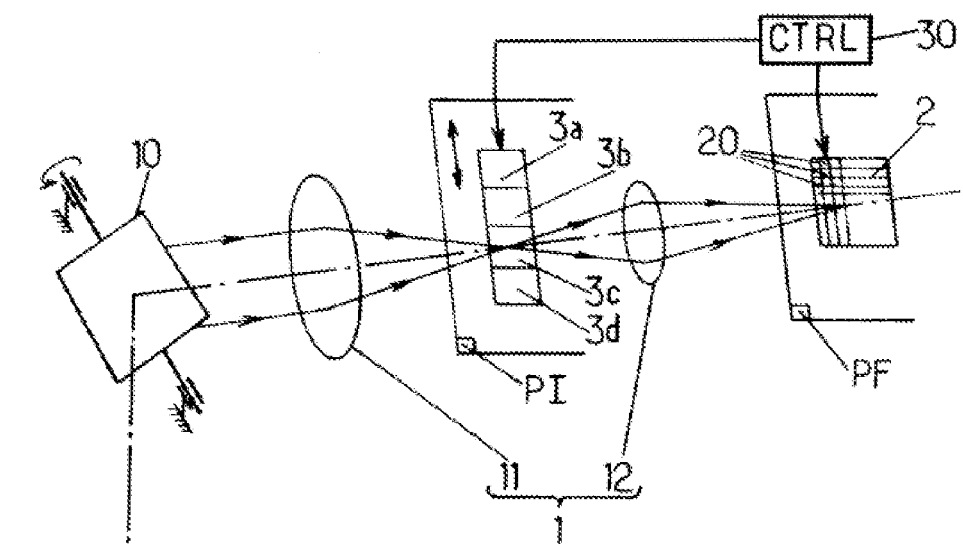
FIG. 2a illustrates a first mode of capturing intermediate images which is compatible with the invention.

In the usual manner and with reference to FIG. 2a, the image-capturing instrument comprises an image-sensing optical system 1, an array 2 of photodetectors 20, and several color filters, for example four filters 3a-3d.

Figure 3A:
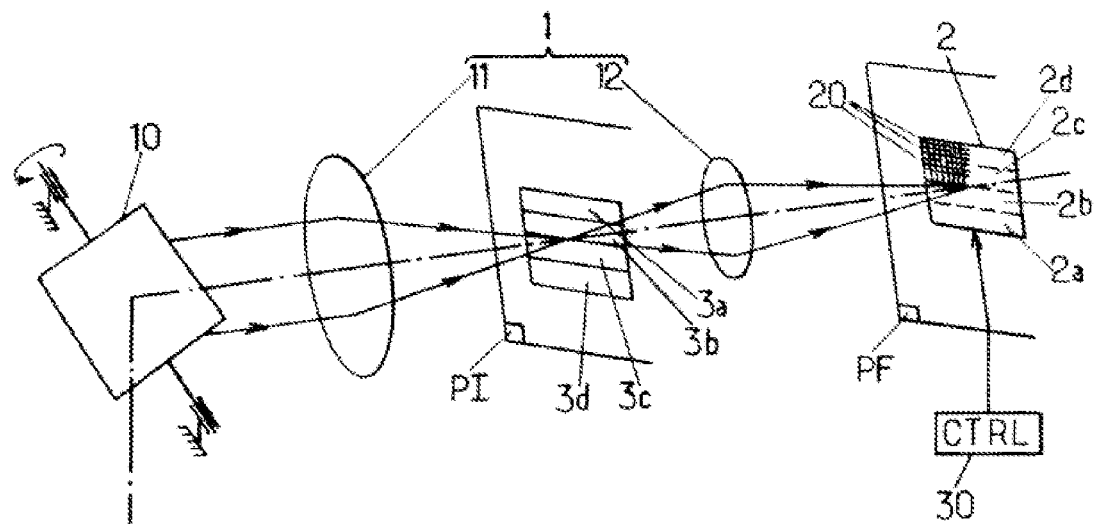
FIG. 3a corresponds to FIG. 2a for a second mode of capturing intermediate images which is also compatible with the invention.
Figure 4:
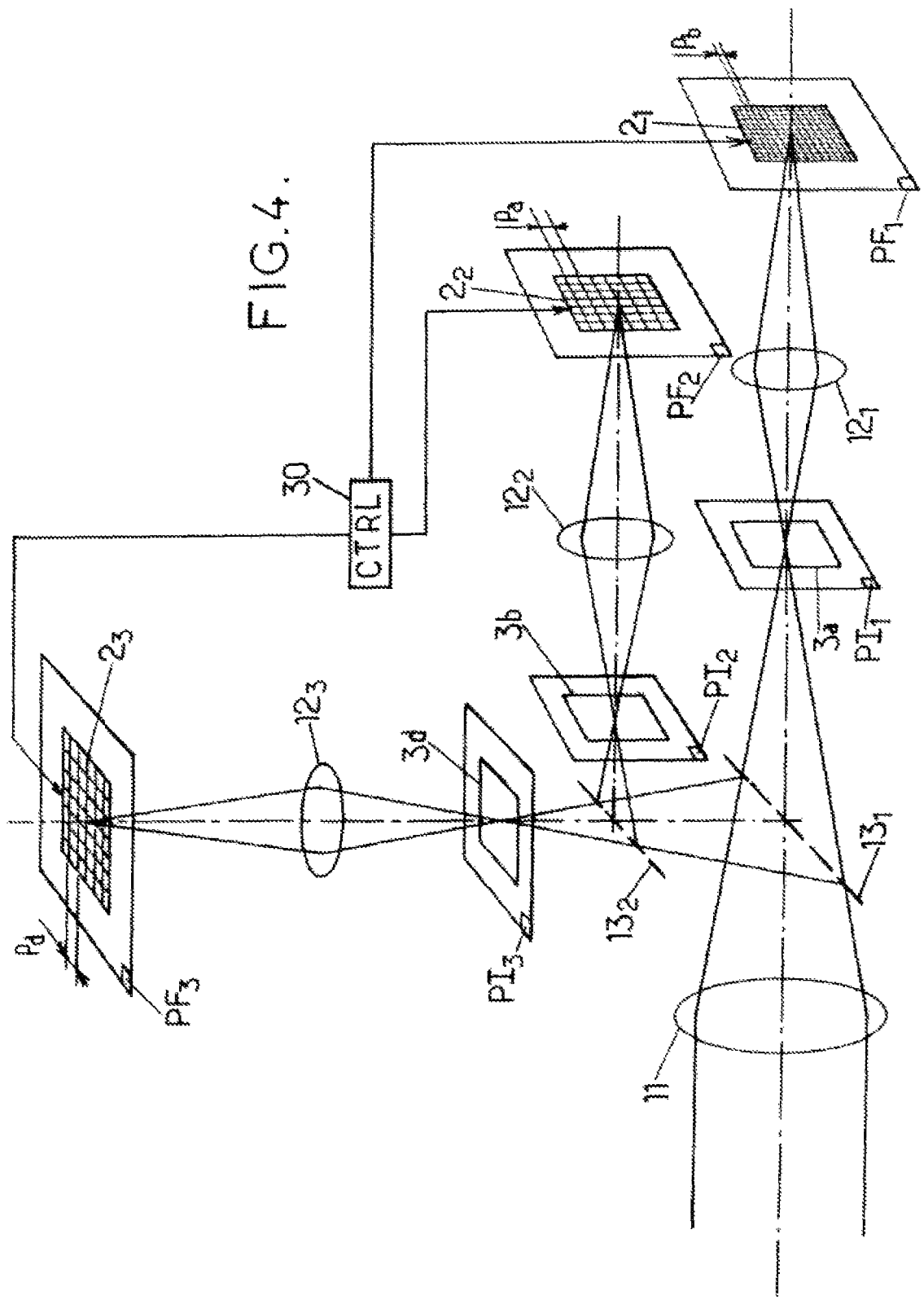
FIG. 4 corresponds to FIG. 2a for a third mode of capturing intermediate images which is again compatible with the invention.

The image-sensing optical system 1 may be of any type operating within the entire band of visible light and beyond, for example between 360 nm and 950 nm. It may comprise an entrance optical system 11 for collecting radiation, and a refocusing optical system 12, with an intermediate focal plane denoted PI. In FIGS. 2a, 3a and 4, the optical systems 11 and 12 are represented as lenses for simplicity, but it is understood that these are usually mirrors. In general, the optical systems 11 and 12 each have a complex structure with multiple reflective and/or refractive components. In the context of the invention, the entrance optical system 11 is a telescope, which may be of any type used in the field of spatial imaging.

The photodetectors 20 are sensitive in the entire observed spectral band, between 360 nm and 950 nm. The array 2 may be rectangular or square, for example of 1024×1024 photodetectors. The photodetectors 20 are arranged in rows and in columns which are side by side in the two perpendicular directions. The array 2 is placed in the focal plane PF of the image-sensing optical system 1.

The image-capturing instrument can be oriented towards the portion of the Earth's surface F in multiple ways. For example, the entire satellite S may be turned to bring the optical axis of the instrument to a central point of the portion F. Another method consists of mounting the instrument onto an intermediate support which can be reoriented relative to the main platform of the satellite S. The instrument is then aimed by actuating the mechanism for orienting the intermediate support. Another method consists of placing a swiveling mirror 10 in front of the entrance to the image-sensing optical system 1, and adjusting the orientation of the mirror 10 so that light rays originating from that portion of the Earth's surface F are reflected by the mirror 10 towards the entrance optical system 11. It is possible for a sequence of multiple images to be captured using the "push-broom" method known to a person skilled in the art. In such a method, the travel of the satellite S above the ground is used to sweep the Earth's surface perpendicularly to the angular velocity V of the satellite.

The image-capturing instrument may additionally comprise an encoding and transmission module, more simply referred to as a transmitter (not represented), for transmitting data corresponding to the captured images to a receiver R of a receiving station located on Earth (FIG. 1). These transmitted data are obtained from signals read from the photodetectors 20. The receiver R then outputs these intermediate image data to an image reconstruction unit (not represented).

For simplicity, we will consider below that the edges of the array 2 of photodetectors 20 determine the boundaries of the portion of the Earth's surface F which is being photographed at each exposure. Alternatively, a field diaphragm placed in the intermediate focal plane PI can determine these boundaries for the portion F.

A polychromatic image of the portion of the Earth's surface F can be obtained from several monochrome images of this same portion, by superimposing them. To this end, each monochrome image, referred to as an intermediate image, is captured for a different spectral sub-band contained within the observation band, through a filter which determines this sub-band. For example, four filters 3a-3d may be placed in the path of the light rays which reach the array 2 through the image-sensing optical system 1. These filters may be located in the intermediate focal plane PI, as represented, but it may be preferable to place them outside this plane, specifically in a pupil plane or in proximity to an array of photodetectors being used. As an illustration, filter 3a may determine a spectral sub-band corresponding to the color blue, from 450 to 500 nm, filter 3b may determine another sub-band corresponding to the color green, from 520 to 560 nm, filter 3c yet another sub-band corresponding to the color yellow, from 570 to 630 nm, and filter 3d to a last sub-band corresponding to the color red, from 640 to 680 nm.

In general, the invention may be implemented with any number n of spectral sub-bands inside the observation band, n being an integer greater than or equal to two. Each spectral sub-band preferably has a width of less than 100 nm, or even less than 60 nm. Such a sub-band is spectrally narrow, such that the corresponding intermediate image is considered to be monochrome or quasi-monochrome.

To implement the invention, one of the spectral sub-bands is limited to shorter wavelengths, relative to at least one other of the sub-bands, within the observed spectral band. The sub-band which is limited to shorter wavelengths is called the first spectral sub-band in the general portion of this description, and the other sub-band is said to be extending towards the long wavelengths. Preferably, the first sub-band contains the color green, meaning the 550 nm wavelength. For example, this first sub-band is between 400 and 600 nm, preferably between 510 and 570 nm. This may be the spectral interval extending from 520 nm to 560 nm previously introduced for filter 3b. The sub-band which is extending towards the long wavelengths may contain the wavelength 650 nm, corresponding to the color red. It may be the spectral interval of filter 3d. These two spectral sub-bands, with one more limited than the other on the side of the long wavelength values, is the minimum structure of spectral sub-bands which is necessary to apply the invention. It may be supplemented by any additional spectral sub-band(s) within the observation band, such as one and/or the other of the spectral intervals for filters 3a and 3c.

FIGS. 2a, 3a and 4 show three alternative optical configurations for the arrangement of the filters 3a-3d in the image-sensing optical system 1. These configurations are equivalent in principle in an implementation of the invention, when the array(s) of photodetectors 20 is(are) used or selected in an appropriate manner, as will be described below.

In the first configuration which is represented in FIG. 2a, filters 3a-3d may be placed in turn in the path of the light rays which reach the array 2. Only one of these filters simultaneously affects the radiation received by all the photodetectors 20. Then the filters 3a-3d may be exchanged so that intermediate images are successively captured by the array 2 with each filter, for the same portion of the Earth's surface F. To this purpose, a mechanism known to a person skilled in the art is actuated between two intermediate image captures, to replace one of the filters 3a-3d with another. In this configuration, each intermediate image which is captured may spread over all the photodetectors 20 of the array 2. When a field diaphragm is used, the image of this diaphragm on this array 2 defines an outline on it, and each intermediate image covers all the photodetectors 20 of the array 2 which are located inside this outline, for each of the spectral sub-bands.

In the second configuration which is represented in FIG. 3a, the filters 3a-3d are fixed and placed simultaneously in the intermediate focal plane PI, forming a partitioning of the view of the portion F which is formed in this plane by the entrance optical system 11. This partitioning is reproduced on the array 2 by the refocusing optical system 12, such that the array 2 appears divided into separate portions 2a-2d which are respectively dedicated to the filters 3a-3d. Thus portion 2a of the array 2 collects the radiation of the sub-band for the color blue, portion 2b collects the radiation of the sub-band for the color green, portion 2c collects the radiation of the sub-band for the color yellow, and portion 2d collects the radiation of the sub-band for the color red. Preferably, the filters 3a-3d have identical dimensions, so that the portions 2a-2d also have identical dimensions within the array 2. The edges of the portions 2a-2d of the array 2 are then determined by those of the filters 3a-3d. During a same exposure of the array 2, different portions Fa-Fd of the Earth's surface, inside the portion F, are respectively imaged on portions 2a-2d of the array 2. The advance of the satellite S enables a sweep B which shifts the views of the portions of the Earth's surface Fa-Fd relative to the array portions 2a-2d. Thus, the view of the portion of the Earth's surface Fd reaches array portion 2c for a second exposure, then array portion 2b for a third exposure, and lastly array portion 2a for a fourth exposure. Each of the exposures therefore produces an intermediate image of the portion of the Earth's surface Fd, through another of the filters 3a-3d. In addition, each intermediate image covers all the photodetectors 20 of the array 2 inside the boundaries of the corresponding array portion 2a-2d.

The third configuration represented in FIG. 4 comprises separate optical paths respectively dedicated to the spectral sub-bands. For clarity in this figure, the optical path dedicated to the sub-band for the color yellow has not been represented, but it is identical in principle to the one dedicated to the color red. The entrance optical system 11 may be common to all paths, which are then separated by beam splitters $13_1$ and $13_2$ or dichroic splitters. Multiple focal planes PF are therefore created, with the arrays of photodetectors $2_1$, $2_2$ and $2_3$ respectively located in focal planes $PF_1$, $PF_2$ and $PF_3$. The filters 3a, 3b and 3d are fixed and located in the intermediate focal planes $PI_1$, $PI_2$ and $PI_3$, with refocusing optical systems $12_1$, $12_2$ and $12_3$ for pairing each intermediate focal plane with the corresponding focal plane. In this case, all the arrays of photodetectors are controlled to capture the intermediate images of the same portion of the Earth's surface F at the same time for all sub-bands used.

Lastly, the second configuration presented above may be combined with a mode of capturing each intermediate image known as Time Delay Integration (TDI). This capture mode is assumed to be known to a person skilled in the art, so that its operation is not repeated here. In this case, each of the arrays of photodetectors is of the TDI type, and each intermediate image is captured in accumulation and read phases which are combined with progressive shifts of the views of the scene F relative to the arrays, in each of the focal planes.

In general for the invention, each filter determining one of the spectral sub-bands affects all the photodetectors 20 to be used to capture the corresponding intermediate image, extending continuously between the points in the view concerned which are imaged on these photodetectors. This configuration of filters is unlike the cases of basic filters of different colors which are associated with neighboring photodetectors in a same array of photodetectors according to the distribution pattern of these basic filters.

Figure 2B:
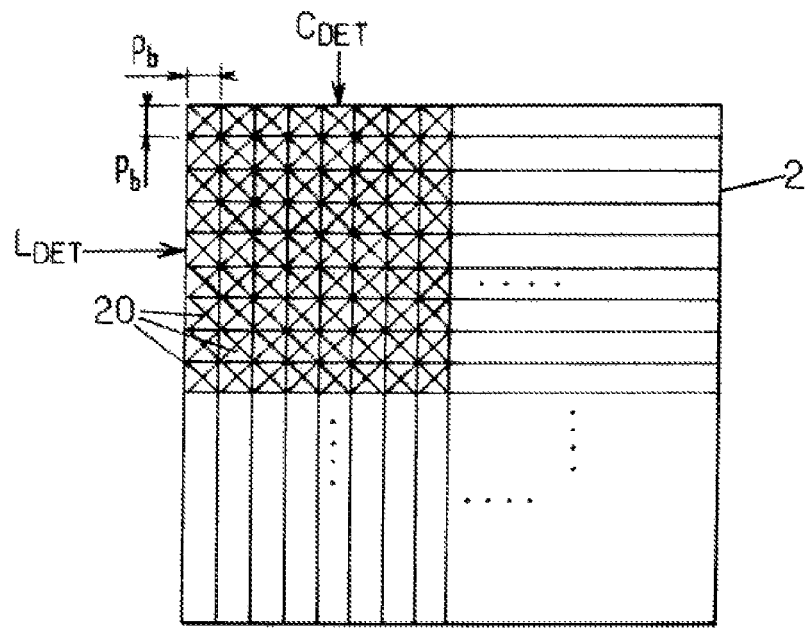

In each configuration, a control unit 30, denoted CTRL, controls the capture of intermediate images by the array(s) of photodetectors. This control is synchronized, depending on the case, with an exchange of filters (FIG. 2a), the advance of the satellite S, or a variation in the orientation of the mirror 10 (FIG. 2b).

The array of photodetectors 20 used to capture the intermediate image for the first spectral sub-band, corresponding to the color green, determines a Nyquist frequency $v_{Nb}$. This Nyquist frequency is equal to $1/(2 \times p_b)$, where $p_b$ is the pitch of the photodetectors 20 in the array performing the sampling of the view associated with the filter 3b. Expressed in terms of spatial frequency in the object space, the Nyquist frequency $v_{Nb}$ is equal to $1/(2 \times GSD)$.

The image-sensing optical system 1 produces a lowpass filtering of the content of that portion of the Earth's surface F. In other words, each view formed by the optical system 1 only contains the image information corresponding to spatial frequencies which are less than a cutoff frequency.

In a known manner, an image-sensing optical system has a pupil which affects the filtering of the image spatial frequencies transmitted by this optical system. The cutoff frequency for this lowpass filtering of the optical system is an increasing function of the pupil dimension. In the present case of spatial imaging, the pupil of the image-sensing optical system 1 is determined by the telescope 11, which is the most voluminous optical component of this optical system. More specifically, it is the entrance mirror of the telescope 11 which most often limits the pupil, through the value of its diameter.

The cutoff frequency which is thus produced by the telescope 11 depends on the spectral sub-band of the filtered radiation that produces the view concerned. Given that the cutoff frequency of the optical system 1 is a decreasing function of the radiation wavelength, the cutoff frequency of the optical system 1, for each of the spectral sub-bands, depends on the upper limit of this sub-band. Therefore the cutoff frequency $v_{Cb}$ of the image-sensing optical system 1 for the first sub-band, which contains the color green, is greater than the cutoff frequency $v_{Cc}$ or $v_{Cd}$ for one of the sub-bands which contains the color yellow (filter 3c) or the color red (filter 3d).

Usually, an image-sensing optical system is sized so that its spatial cutoff frequency $v_{Ci}$, for each spectral sub-band i which is used, does not itself limit the image information more than the sampling done by the photodetectors used for this spectral sub-band. In other words, a person skilled in the art usually chooses the size of the pupil of the image-sensing optical system so that its spatial cutoff frequency is greater than the Nyquist frequency for the entire observed spectral band. In the invention, the optical system 1 is selected to satisfy this condition for the first spectral sub-band, which corresponds to the color green of filter 3b: $v_{Nb} < v_{Cb}$.

In the invention, the optical system 1 is also selected so that its spatial cutoff frequency for at least one other sub-band which contains a wavelength greater than the color green, is less than the Nyquist frequency for the color green. For example: $v_{Cd} < v_{Nb} < v_{Cb}$, $v_{Cd}$ being the spatial cutoff frequency for the optical system 1 for the color red of filter 3d. In this manner, the image information for the color red contained in the corresponding view is limited by the optical system 1, but this optical system has dimensions which are substantially reduced.

The size of the pupil of the image-sensing optical system 1 is selected by applying known principles, to satisfy the above double inequality. Therefore, in the invention the diameter of the pupil is chosen to be just greater than $H \times \lambda_{b\ max}/(2 \times GSD)$, and less than $H \times \lambda_{r\ max}/(2 \times GSD)$, where:

H is the altitude of the satellite S above the ground, $\lambda_{b\ max}$ is the maximum wavelength of the first spectral sub-band, which preferably corresponds to the color green, $\lambda_{r\ max}$ is the maximum wavelength of the spectral sub-band extending towards the long wavelengths, which may correspond to the color red, and GSD is the resolution of the final image expressed in the object space.

For example, by applying the invention to an image-capturing instrument which is carried on board a geostationary satellite, a resolution of 10 m (meters) at the nadir for the final polychromatic image can be obtained with a circular pupil of the optical system 1 having a diameter of between 1.15 m and 1.25 m. Without using the invention, the diameter of the pupil of the optical system 1 would be increased by a factor of more than two.

When the intermediate image corresponding to the sub-band for the color red is captured with the condition $v_{Cd} < v_{Nb}$, it is not necessary for the Nyquist frequency for this red sub-band to be equal to the one for the green sub-band. In other words, the intermediate image for the red sub-band can be captured with a resolution which is larger, or less fine, than the resolution of the intermediate image for the green sub-band. As the views are formed by the same optical system 1 for all the spectral sub-bands, the sampling of the view for the red sub-band may be less than that for the green sub-band.

We will now describe two methods for respectively capturing intermediate images for the green sub-band and for the other spectral sub-bands with different resolutions. In these examples, the intermediate image captured for the first spectral sub-band, green, is formed using a sampling pitch for the corresponding view which is two times smaller than another sampling pitch used to capture the intermediate image for another spectral sub-band more extended towards the long wavelengths, for example red. Each array of photodetectors 20 is formed of rows $L_{DET}$ and columns $C_{DET}$ of photodetectors which are adjacent, and all the sampling pitches considered are measured parallel to these rows and columns of photodetectors.

Figure 2C:
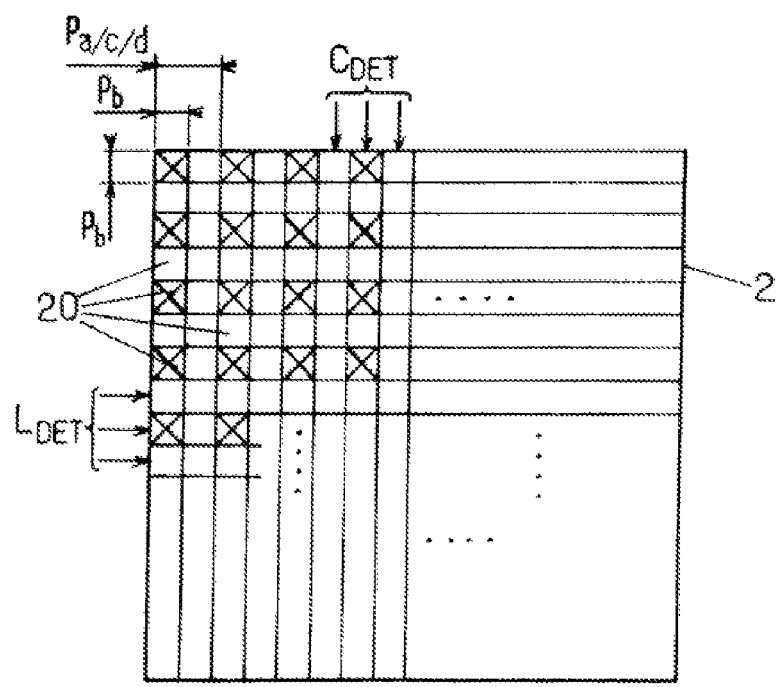

FIGS. 2b and 2c illustrate the first method for the configuration in FIG. 2a, when the same array 2 is used to capture all the intermediate images. They represent this array 2, with each box representing a photodetector 20. In these figures, the photodetectors 20 which are marked with an X are used to capture the intermediate image of the corresponding view, and those which are not marked with an X are not used, meaning the intensity values that they capture are not transmitted. FIG. 2b corresponds to the use of the array 2 for the green sub-band from filter 3b: all the photodetectors 20 are used. FIG. 2c corresponds to the use of the same array 2 for the yellow sub-band from filter 3c or the red sub-band from filter 3d: the photodetectors 20 which are used are limited to a selection of one out of every two along the rows $L_{DET}$ and columns $C_{DET}$. In this manner, the sampling for the green spectral sub-band corresponds to a surface density which is four times greater than in the sampling for the yellow and red spectral sub-bands. In FIGS. 2b and 2c, $p_b$ denotes the sampling pitch for the color green, and $p_{c/d}$ the pitch for the color yellow or red. An advantage of this mode for capturing intermediate images other than the image associated with the color green, using only one photodetector 20 out of four, is the reduction in the crosstalk which may occur between neighboring photodetectors 20 in the array 2. This improves the contribution of the photodetectors to the total modulation transfer function of the image-capturing instrument.

Figure 3B:
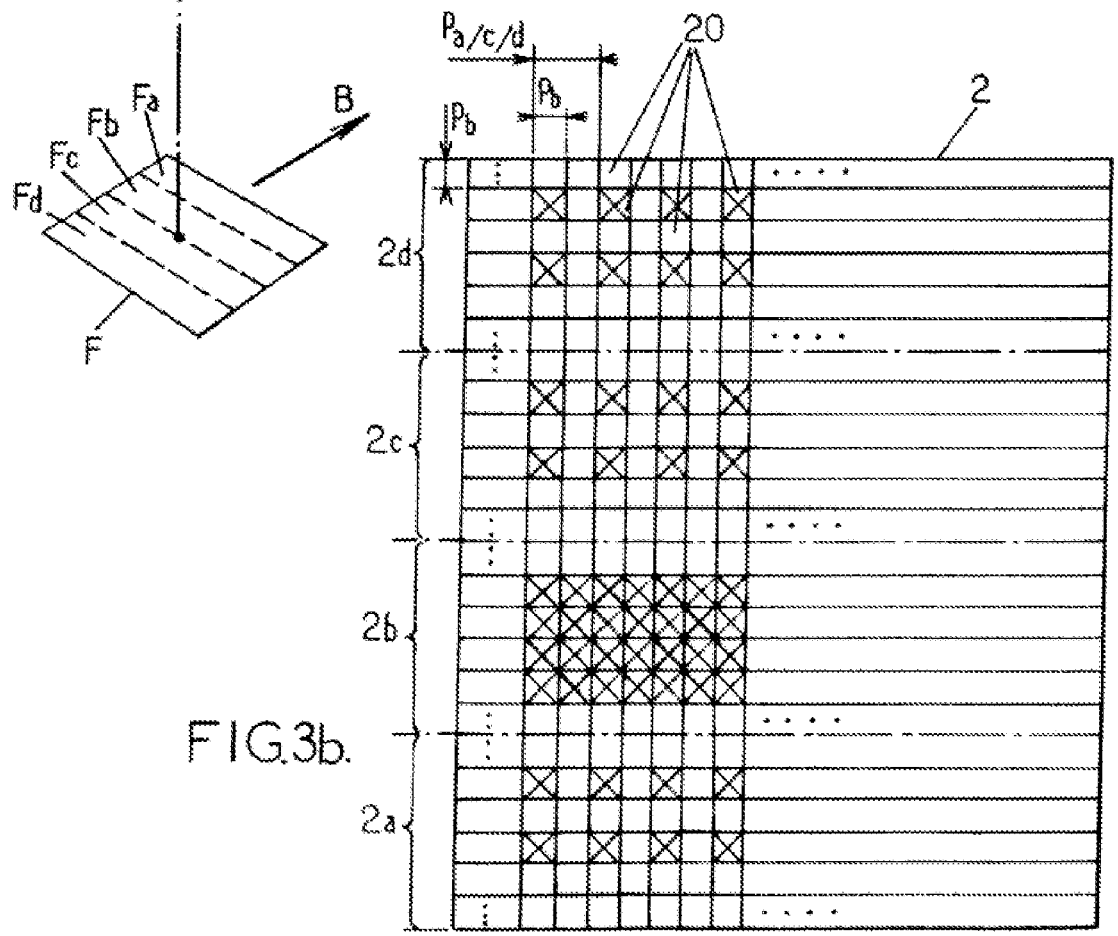

FIG. 3b illustrates a transposition of this first method of capturing intermediate images to the configuration in FIG. 3a. During a same exposure of the array 2, all the photodetectors 20 are read inside the portion 2b corresponding to the filter 3b for the green sub-band, and only one photodetector 20 out of four is read or transmitted within the portions 2a, 2c and 2d corresponding to the other sub-bands.

The second method for capturing intermediate images is applicable when separate arrays of photodetectors are used for the different sub-bands, as in the configuration in FIG. 4. In this case, the array of photodetectors $2_1$ which is used for the green sub-band may have a pitch $p_b$ which is equal to half the pitch $p_d$ of the array $2_3$ used for the red sub-band: $p_b=0.5\times p_d$. In this case where all the photodetectors 20 of each array are used to capture the intermediate images, the sampling pitches are identical to the individual widths of the rows $L_{DET}$ and columns $C_{DET}$ of photodetectors of this array. The view sampling for the green sub-band then corresponds to a surface density which is four times greater than in the view sampling for the red spectral sub-band.

More generally, the view sampling for the first spectral sub-band preferably corresponds to a surface density which is four times greater than in the view sampling for the spectral sub-band which is more extended towards the long wavelength values.

Given that the resolution GSD is equal to the pitch of the photodetectors 20 divided by the focal length of the image-sensing optical system 1, and multiplied by the image capture altitude, the resolution of the intermediate image which is captured for the color green is two times smaller, or twice as fine, as that of the intermediate image which is captured for the color red. For example, when the resolution is equal to 10 m for the color green, it may thus be equal to 20 m for the color red.

When an intermediate image is also captured for the spectral sub-band which corresponds to the color blue, it is preferably captured using the same sampling pitch as for the yellow or red sub-band, meaning twice as large as the one used to capture the intermediate image for the green sub-band. In other words: $p_a=p_c=p_d$.

Under these conditions, the intermediate images for the colors blue, yellow and red each correspond to four times less image data than in the intermediate image for the color green. Thus the transmission time between the transmitter which is on board the satellite S and the terrestrial receiver R (FIG. 1), for a final polychromatic image, is reduced in comparison to the case where all the intermediate monochrome images have the same resolution, meaning the resolution associated with the color green. More generally, the intermediate image data transmitted between the transmitter and the receiver for the first spectral sub-band correspond to four times more signals read from the photodetectors than in the intermediate image data transmitted for the spectral sub-band extending towards the long wavelengths, for the same scene captured in all the spectral sub-bands.

The image reconstruction unit then merges the intermediate images from all the spectral sub-bands to obtain the final polychromatic image. Methods for merging images which are known to a person skilled in the art may be used. The final image then has the finest resolution among the respective resolutions of all the intermediate images. Therefore the final image has the resolution of the intermediate image associated with the color green. In addition, the polychromatic quality contributed by the other colors to the visual rendering of this final reconstructed image is in line with the image resolution, because the color green substantially corresponds to the maximum spectral sensitivity of the human eye.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A polychromatic imaging method in the spectral band of 360 nm to 950 nm used for observation, comprising the following steps:

carrying an image-sensing optical system on board an aircraft or spacecraft, said image-sensing optical system comprising a telescope and being adapted to form views, in at least one focal plane, respectively based on radiation within several spectral sub-bands each contained within the observation spectral band;

placing at least one array of photodetectors in said at least one focal plane, in order to capture an intermediate image of each view formed by the image-sensing optical system at a resolution associated with said intermediate image;

respectively capturing the intermediate images of a same scene for each spectral sub-band; and merging the intermediate images respectively captured for the spectral sub-bands, in order to form a final polychromatic image, the telescope of the image-sensing optical system determining a pupil which is common to the spectral sub-bands, and a dimension of said common pupil setting a spatial cutoff frequency which is different for each spectral sub-band, the spectral sub-bands comprising a first spectral sub-band and at least one other spectral sub-band extending towards long wavelengths, with said other spectral sub-band extending towards the long wavelengths having at least one wavelength greater than an upper limit of said first spectral sub-band, the pupil of the telescope being sized such that the spatial cutoff frequency for the first spectral sub-band is greater than a Nyquist frequency of the intermediate image captured for said first spectral sub-band, the method being characterized by the pupil of the telescope additionally being sized so that the spatial cutoff frequency, for said other spectral sub-band extending towards the long wavelengths, is less than the Nyquist frequency of the intermediate image captured for said first spectral sub-band.

2. The method according to claim 1, wherein the first spectral sub-band comprises the 550 nm wavelength.

3. The method according to claim 1, wherein the final polychromatic image has a resolution equal to the resolution of the intermediate image captured for the first spectral sub-band.

4. The method according to claim 1, wherein the first spectral sub-band corresponds to a green color, the other spectral sub-band extending towards the long wavelengths corresponds to a red color, and yet another spectral sub-band corresponds to a blue color.

5. The method according to claim 1, wherein the intermediate image captured for the first spectral sub-band is formed using a sampling pitch for the corresponding view which is two times smaller than another sampling pitch used to capture the intermediate image for the other spectral sub-band extending towards the long wavelengths, said sampling pitches being measured parallel to the rows and columns of photodetectors, such that the sampling for said first spectral sub-band corresponds to a surface density four times greater than in the sampling for said other spectral sub-band extending towards the long wavelengths.

6. The method according to claim 5, wherein the rows and columns of the photodetectors are adjacent in each array of photodetectors used, and wherein the intermediate image captured for the first spectral sub-band is obtained using all the photodetectors of the array used for said first spectral sub-band, and wherein the intermediate image captured for said other spectral sub-band extending towards the long wavelengths is obtained by selecting one photodetector out of two along the rows and columns of the photodetectors of the array used for said other spectral sub-band.

7. The method according to claim 5, wherein the array of photodetectors used to capture the intermediate image for said first spectral sub-band has a row width and column width which is two times smaller than a row width and column width of the array of photodetectors used to capture the intermediate image for said other spectral sub-band extending towards the long wavelengths.

8. The method according to claim 4, wherein the intermediate image captured for the spectral sub-band corresponding to the color blue is based on the same sampling pitch as said other spectral sub-band extending towards the long wavelengths, corresponding to the color red, and two times larger than the sampling pitch used to capture the intermediate image for the first spectral sub-band, corresponding to the color green.

9. The method according to claim 1, wherein the scene for which the intermediate images are captured is a portion of the Earth's surface.

10. Method according to claim 1, wherein intermediate image data are transmitted between the aircraft or spacecraft and a receiving station for each spectral sub-band, the intermediate image data transmitted for the first spectral sub-band corresponding to four times more signals read from the photodetectors than the intermediate image data transmitted for the other spectral sub-band extending towards the long wavelengths, for the same scene captured in all the spectral sub-bands.

11. A polychromatic imaging system adapted for being carried on board an aircraft or spacecraft, said system comprising:

an image-sensing optical system comprising a telescope and adapted to form views, in at least one focal plane, respectively based on radiation within several spectral sub-bands each contained within the observation spectral band of 360 nm to 950 nm;

at least one array of photodetectors located in said at least one focal plane, adapted to capture an intermediate image of each view at a resolution associated with said intermediate image;

a control unit adapted to control the respective capture of intermediate images of a same scene for each spectral sub-band; and an image reconstruction unit adapted to merge the intermediate images respectively captured for the spectral sub-bands, in order to form a final polychromatic image, the telescope of the image-sensing optical system determining a pupil which is common to the spectral sub-bands, and a dimension of said common pupil setting a spatial cutoff frequency which is different for each spectral sub-band, the system being adapted to set a first of the spectral sub-bands and another of said spectral sub-bands which extends towards long wavelengths, with said other spectral sub-band extending towards the long wavelengths having at least one wavelength greater than an upper limit of said first spectral sub-band, the pupil of the telescope being sized such that the spatial cutoff frequency for the first spectral sub-band is greater than a Nyquist frequency of the intermediate image captured for said first spectral sub-band, said system being characterized in that the pupil of the telescope is additionally sized so that the spatial cutoff frequency, for said other spectral sub-band extending towards the long wavelengths, is less than the Nyquist frequency of the intermediate image captured for said first spectral sub-band.

12. The system according to claim 11, adapted so that the first spectral sub-band includes the 550 nm wavelength.

13. The system according to claim 11, wherein the image reconstruction unit is adapted so that the final polychromatic image has a resolution equal to the resolution of the intermediate image captured for the first spectral sub-band.

14. The system according to claim 11, adapted so that the first spectral sub-band corresponds to a green color, the other spectral sub-band extending towards the long wavelengths corresponds to a red color, and yet another spectral sub-band corresponds to a blue color.

15. The system according to claim 11, adapted to capture intermediate images according to sampling pitches of the respective corresponding views for the spectral sub-bands, with the sampling pitch used for the first spectral sub-band being two times smaller than the sampling pitch used to capture the intermediate image for the other spectral sub-band extending towards the long wavelengths, said sampling pitches being measured parallel to the rows and columns of photodetectors, such that the sampling for said first spectral sub-band corresponds to a surface density four times greater than in the sampling for said other spectral sub-band extending towards the long wavelengths.

16. The system according to claim 15, wherein the rows and columns of the photodetectors are adjacent in each array of photodetectors, and wherein the control unit is adapted to capture the intermediate image for the first spectral sub-band using all the photodetectors of the array used for said first spectral sub-band, and to capture the intermediate image for said other spectral sub-band extending towards the long wavelengths by selecting one photodetector out of two along the rows and columns of the photodetectors of the array used for said other spectral sub-band.

17. The system according to claim 15, wherein the array of photodetectors used to capture the intermediate image for said first spectral sub-band has a row width and column width which is two times smaller than a row width and column width of the array of photodetectors used to capture the intermediate image for said other spectral sub-band extending towards the long wavelengths.

18. The system according to claim 14, adapted to capture the intermediate image for the spectral sub-band corresponding to the color blue using the same sampling pitch as for said other spectral sub-band extending towards the long wavelengths, corresponding to the color red, and two times larger than the sampling pitch used to capture the intermediate image for the first spectral sub-band, corresponding to the color green.

19. The system according to claim 11, additionally comprising:
   a transmitter arranged to transmit intermediate image data for each spectral sub-band, from signals read from the photodetectors; and
   a receiver arranged to receive said intermediate image data transmitted by the transmitter, and to output said intermediate image data to the image reconstruction unit,
   the system being adapted so that the intermediate image data transmitted between the transmitter and the receiver for the first spectral sub-band correspond to four times more signals read from the photodetectors than in the intermediate image data transmitted for the other spectral sub-band extending towards the long wavelengths, for the same scene captured in all the spectral sub-bands.

* * * * *